United States Patent Office 3,613,202
Patented Oct. 19, 1971

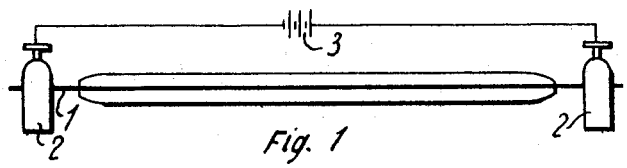
Fig. 1
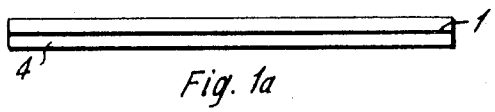
Fig. 1a
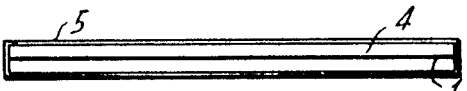
Fig. 1b
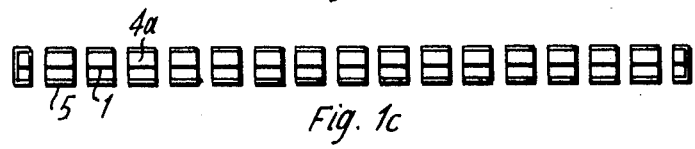
Fig. 1c
Fig. 1d
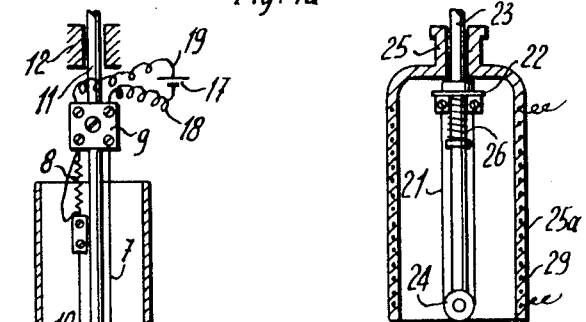
Fig. 2   Fig. 3
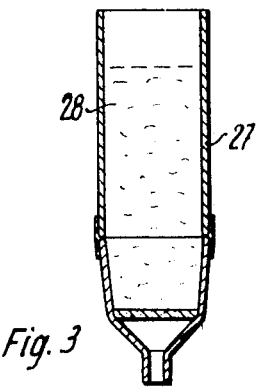
INVENTOR.
Robert SODER
BY Kenwood Ross
ATTORNEY.

3,613,202
METHOD OF MANUFACTURING BEARINGS, PARTICULARLY MICROBEARINGS
Robert Soder, Territet, Switzerland, assignor to Ebauches S.A., Neuchatel, Switzerland
Filed Feb. 7, 1969, Ser. No. 797,580
Claims priority, application Switzerland, Feb. 29, 1968, 3,063/68
Int. Cl. B21d 53/10
U.S. Cl. 29—149.5 NM                12 Claims

ABSTRACT OF THE DISCLOSURE

A process for manufacturing bearings, particularly microbearings comprising, embedding an elongated support in at least one particular material so as to produce a bar of this material which is traversed longitudinally by the support, slicing the bar into fragments the thickness of which corresponds to the weight of the bearings to be manufactured, exposing these fragments to the action of a support-etching agent so as to destroy the material of the support in the fragments and thus producing therein a longitudinal hole, which includes providing around the support a gradient of particles of the particular material, said particles being progressively deposited and agglomerated on the support, this resulting in progressive embedment of the support.

---

The present invention relates to a method of manufacturing bearings, particularly microbearings.

The manufacture of small bearings, the weight of which is less than 0.2 g., for example, by the standard methods of injection or compression, presents great difficulties. In fact, the filling of mould cavities and demoulding are not correctly carried out for small parts, so that it is practically impossible to obtain moulded elements with stable dimensions.

The object of this invention is to provide a method of manufacturing bearings particularly intended for the manufacture of very small parts.

This method is characterised by the steps of agglomerating at least one particular material on an elongated support so as to form a bar of this material which is traversed longitudinally by the support, sectioning the bar into parts the lengths of which correspond to the height of the bearings to be manufactured, and exposing these parts to the action of a support-destroying agent so as to destroy the elements of the latter being present in the parts and thus to produce therein a longitudinal hole.

The drawing shows, by way of example, several embodiments of apparatus for carrying out the present method.

FIG. 1 illustrates schematically one form of apparatus for carrying out the method.

FIGS. 1a, 1b, 1c and 1d illustrate different stages in the manufacture of bearings by means of the apparatus of FIG. 1.

FIG. 2 is a schematic axial cross section of a second embodiment of apparatus for carrying out the present method; and FIG. 3 is a schematic axial cross section of a third embodiment of apparatus for carrying out the present method.

Referring to FIG. 1, there is shown a wire 1, for example an aluminium wire, which is suspended between two terminals 2 connected to an electric current source 3, for example of 1.2 to 1.6 volts, intended to heat the wire 1 to a temperature very slightly above the melting temperature of the thermoplastic pulverulent material used to form the body of the bearings to be manufactured. This material, in the particle state, is projected onto the hot wire and thus melts so as to form a basic layer by sintering on the wire.

Self-lubricating plastic materials, for example, polyoxymethylene, are preferably used.

A bar 4 of plastic material is thus produced, the ends of which are then cut as illustrated in FIG. 1a.

This bar 4 is then outwardly metallised with a layer 5 represented in FIG. 1b. This metallisation takes place after a preliminary treatment of the bar rendering its surface conductive. As material for the metallisation, polished nickel or a nickel-tin alloy, the latter being easily soldered, can be used. The layer of metallisation can be relatively thick so as to form a setting surrounding the bearings once these have been completed.

The bar is then sectioned into parts 4a (FIG. 1c) the lengths of which correspond to the height of the bearings to be manufactured.

These parts are dipped into a bath of caustic potash at 5–6% for example, heated to approximately 50° C., which attacks the elements of the aluminium wire 1 which are still present in the parts 4a. On removal from this bath, these parts 4a are thus in the form illustrated in FIG. 1d in which the elements of the wire have been dissolved by the potassium so that each part 4a is traversed by a longitudinal hole 6.

The surface of the wall of the hole 6 corresponds exactly to the replica of the surface of the wire. It is, therefore, sufficient to utilise a perfectly polished wire so that the wall of the holes is likely polished.

As thermoplastic material, instead of polyoxymethylene, polyamides, polyimides, fluorocarbons, polyphenyleneoxydes, polyethyleneterephthalates, etc. can be used.

Only the layer of plastic material in contact with the aluminium wire is submitted to friction, so that there need only be a very thin layer while still keeping a margin for erosion. Consequently, as a modification, once this first layer has been achieved another pulverulent material can be used in order to form the body of the bar 4, this other material possessing properties—resistant to compression for example—greater than that of the self-lubricating material used for the layer submitted to friction. In this case, the metallisation could be eliminated since the bar possesses itself a sufficient resistance which does not need the reinforcement due to the metallised layer. This reinforcing plastic material may be replaced by a galvanoplastically deposited metallic layer.

A porous friction surface can also be obtained by mixing aluminium powder with the self-lubricating plastic material, for example aluminum powder in particles of a specified size. By means of this powder mixture a first layer deposited on the aluminium wire is obtained, followed by layers of plastic material only, with no aluminium powder; this material may be the same as that of the inner layer or may be different.

During the treatment by means of the wire destructor agent, namely caustic potash, the particles of aluminium powder are destroyed at the same time as the wire elements so that cavities giving a porous structure to the inner layer are formed on the wall of hole 6. This porosity can be adjusted either in depth or in number or in the dimension of the pores by choice of the dimension and of the concentration of the aluminium powder.

These pores are intended to receive a liquid or semi-solid lubricant such as wax which penetrates by capillarity, the pores forming a relatively important reservoir of this lubricant. In addition, to increase the affinity between the lubricant and the plastic material, the lubricant can be given specific properties which permit a slight but limited bulging of the plastic material. The fixation property of the lubricant is thus increased and the risk of migration avoided.

The ultimate goal is to establish a balance between the adsorption power lubricant plastic material and the adsorption power lubricant polished steel of the shaft which traverses the bearing.

In the apparatus illustrated in FIG. 2, an aluminium wire 7 is stretched by a spring 8 between a support 9 and a steatite insulator 10, this support and this insulator being carried by a steel rod 11 silding in a support 12. A Pyrex (registered trademark) glass 13 is placed coaxially to the rod 11 and is connected at its lower end by a rubber joint 14 to a mouthpiece 15 provided at its base with a filter 16 of powdered glass. This mouthpiece 15 is elongated by a tube 15a intended to be connected to a source of well dried, 99.5% pure for example, nitrogen.

On the filter 16 is placed a fine powder of polyoxymethylene stabilised by reaction with an isocyanate, and the grains of which have a maximum diameter of 80 microns.

The aluminuium wire 7 is heated by means of an electric current from a source 17 of 1.2 to 1.6 volts, and carried by wires 18 and 19. Once the wire is hot, the current of nitrogen is introduced into the vessel 13, this current causing a swirling movement of the powder in the portion of vessel 13 indicated by 20 in FIG. 2.

The hot wire is dipped for a few seconds into the bed of swirling powder 20, the time being sufficient so that a homogeneous film is formed around the wire. The period of time spent in this swirling bed determines the thickness of the bar.

In the embodiment shown in FIG. 3, an aluminium wire 21 is suspended, as in the embodiment of FIG. 2, between a support 22 slidably mounted on a rod 23 and a steatite insulator 24 which is fixed at the end of rod 23. The latter is mounted so as to slide into a support 25. A spiral spring 26 placed on the rod 23 is supported by this rod and by the support 22 so as to keep wire 21 stretched. The apparatus includes, as is the embodiment of FIG. 2, a Pyrex vessel 27 in which a swirling movement of thermoplastic material is produced at 28.

In this embodiment, support 25 carries a bell 25a of insulating material which encloses an electric heating apparatus 29. Wire 21 is heated when it is in the position illustrated in the drawing, then the rod 23 is lowered, plunging the hot wire into the area of the swirling bed 30 of plastic material.

The operation is repeated as many times as necessary in order to obtain a bar of the required section by deposit of successive layers.

As another modification, in lieu of producing the agglomeration of plastic material on the support by the fusion of an already polymerised material, polymerisation of plastic material, for example formaldehyde in gaseous or liquid phase, could take place in situ, that is to say on the support itself. The starting of the reaction of polymerisation takes place, through use of a catalyst, by the application of heat, by electrophoric action, by silent electric discharge or by ionising rays such as ultra violet, gamma, alpha or beta rays.

Likewise, the agglomeration of this particular material on the support could take place through a galvanic procedure, using a galvanic bath containing, besides its metallic components, a suspension of the plastic material used, in fine powder, which is deposited with the metal by electrophoretic migration. By chemical attack a porous friction surface can then be produced which is not in direct contact with the deposited metal.

I claim:

1. A process for manufacturing bearings, particularly microbearings, comprising, embedding an elongated support in at least one particular material so as to produce a bar of this material which is traversed longitudinally by the support, slicing the bar into fragments the thickness of which corresponds to the weight of the bearings to be manufactured, exposing these fragments to the action of a support-etching agent so as to destroy the material of the support in the fragments and thus producing therein a longitudinal hole, including providing around the support a gradient of particles of the particular material, said particles being progressively deposited and agglomerated on the support, this resulting in progressive embedment of the support.

2. The process of claim 1, wherein the particular material used is a self lubricating plastic material.

3. The process of claim 1, wherein a polymerised thermo-plastic material is used as the particular material, and the agglomeration of this material is produced by sintering.

4. The process of claim 1 which includes heating the support in a gaseous suspension of particles of the particular material so that said particular material is deposited on the support by fusion.

5. The process of claim 1, wherein the layers of agglomerated material are heated on the support so as to facilitate the progress of the depositing process.

6. The process of claim 1, wherein a particular material in suspension in a galvanic bath is used, and wherein the agglomeration of this material takes place by electrodeposition.

7. The process of claim 1, wherein successive layers of different materials forming the said bar are deposited.

8. The process of claim 1, wherein the particular material is mixed with particles of material capable of destruction by an agent which does not destroy the particular material, and wherein the blanks of the bearings are submitted to the action of such an agent so that these particles are destroyed and form microcavities in the bar to give it a porous structure, the microcavities being suitable for retaining a lubricant.

9. The process of claim 1, wherein the support used is wire shaped.

10. The process of claim 1, wherein a stretched metallic wire is used as the support.

11. The process of claim 10, wherein the stretched wire is electrically heated.

12. The process of claim 1, wherein the outer surface of the said bar is metallized before the bar is sectioned, wherefore the plastic material of the bearings is ringed in a setting.

References Cited

UNITED STATES PATENTS

| | | | |
|---|---|---|---|
| 1,654,936 | 1/1928 | Jones | 29—424 |
| 2,083,865 | 6/1937 | Rensink | 29—424 |
| 3,183,567 | 5/1965 | Riseman | 29—604 |
| 3,325,881 | 6/1967 | Engelking | 29—625 |
| 3,392,053 | 7/1968 | Olson | 29—424 |

FOREIGN PATENTS

| | | |
|---|---|---|
| 833,958 | 5/1960 | Great Britain. |

JOHN F. CAMPBELL, Primary Examiner

D. P. ROONEY, Assistant Examiner

U.S. Cl. X.R.

29—149.5 R, 149.5 S; 68—269; 252—12.2